United States Patent
Natarajan et al.

(10) Patent No.: US 10,762,552 B2
(45) Date of Patent: Sep. 1, 2020

(54) RETAIL SUBSCRIPTION IN INTERNET OF THINGS ENVIRONMENT

(71) Applicant: Walmart Apollo, LLC, Bentonville, AR (US)

(72) Inventors: Chandrashekar Natarajan, San Ramon, CA (US); Donald R. High, Noel, MO (US)

(73) Assignee: WALMART APOLLO, LLC, Bentonville, AR (US)

( * ) Notice: Subject to any disclaimer, the term of this patent is extended or adjusted under 35 U.S.C. 154(b) by 646 days.

(21) Appl. No.: 15/297,426

(22) Filed: Oct. 19, 2016

(65) Prior Publication Data
US 2017/0124633 A1    May 4, 2017

Related U.S. Application Data

(60) Provisional application No. 62/247,878, filed on Oct. 29, 2015.

(51) Int. Cl.
| | |
|---|---|
| *G06Q 30/06* | (2012.01) |
| *G06Q 30/00* | (2012.01) |
| *G06Q 30/02* | (2012.01) |
| *G06Q 10/08* | (2012.01) |
| *G06Q 10/10* | (2012.01) |

(52) U.S. Cl.
CPC ....... *G06Q 30/0635* (2013.01); *G06Q 30/014* (2013.01); *G06Q 30/0255* (2013.01); *G06Q 30/0264* (2013.01); *G06Q 10/0833* (2013.01); *G06Q 10/109* (2013.01)

(58) Field of Classification Search
CPC .................................................. G06Q 30/0635
USPC ....................................................... 705/26.81
See application file for complete search history.

(56) References Cited

U.S. PATENT DOCUMENTS

| | | | | |
|---|---|---|---|---|
| 6,204,763 | B1 * | 3/2001 | Sone | A47G 29/141 221/2 |
| 7,979,309 | B1 * | 7/2011 | Stevens | G06Q 10/087 705/26.8 |
| 8,249,946 | B2 * | 8/2012 | Froseth | G06Q 10/08 416/72 |
| 8,284,056 | B2 | 10/2012 | McTigue | |

(Continued)

FOREIGN PATENT DOCUMENTS

| | | |
|---|---|---|
| CN | 203204656 U | 9/2013 |
| CN | 103335485 A | 10/2013 |
| CN | 203550407 U | 4/2014 |

OTHER PUBLICATIONS

How to stop Alexa from ordering stuff without your permission, Lory Gil, Jan. 10, 2017, https://www.imore.com/how-stop-alexa-ordering-stuff-without-your-permission (Year: 2017).*

(Continued)

*Primary Examiner* — Ming Shui
(74) *Attorney, Agent, or Firm* — Schmeiser, Olsen & Watts LLP; Timothy P. Collins

(57) ABSTRACT

A system and method for item replenishment comprise a subscription device that associates tags with items, a tag tracking device for collecting data on the tags associated with the items, and a management system that monitors changes in use of the items, including analyzing use patterns to determine when the items should be replenished, replaced, or upgraded.

18 Claims, 5 Drawing Sheets

(56) References Cited

U.S. PATENT DOCUMENTS

| | | | | |
|---|---|---|---|---|
| 8,423,180 B1* | 4/2013 | Frederick | ............ | G06Q 10/087 |
| | | | | 700/236 |
| 8,976,029 B1 | 3/2015 | McTigue | | |
| 9,165,320 B1* | 10/2015 | Belvin | ............... | G06Q 30/0633 |
| 9,653,310 B1* | 5/2017 | Li | ........................ | H01L 21/3065 |
| 10,013,842 B2* | 7/2018 | Levesque | ............ | G06Q 10/087 |
| 2003/0158796 A1* | 8/2003 | Balent | ................ | G06Q 30/0633 |
| | | | | 705/28 |
| 2006/0163349 A1* | 7/2006 | Neugebauer | ......... | G06Q 20/387 |
| | | | | 235/383 |
| 2009/0075242 A1* | 3/2009 | Schwarzberg | ..... | G09B 19/0092 |
| | | | | 434/127 |
| 2014/0244825 A1 | 8/2014 | Cao et al. | | |
| 2015/0019342 A1 | 1/2015 | Gupta | | |
| 2015/0149298 A1 | 5/2015 | Tapley | | |
| 2015/0186836 A1* | 7/2015 | Chouhan | ............ | G06F 16/9535 |
| | | | | 705/28 |

OTHER PUBLICATIONS

Keep your kids from shopping through Amazon Echo, Taylor Martin, Jan. 30, 2017, https://www.cnet.com/how-to/amazon-echo-how-to-prevent-accidental-purchases-with-alexa/ (Year: 2017).*

International Preliminary Report on Patentability in Application No. PCT/US16/57634, dated May 11, 2018; 7 pages.

International Search Report & Written Opinion in counterpart International Patent Application No. PCT/US16/57634, dated Jan. 12, 2017; 9 pages.

Itzkovitch, Avi, "The Internet of Things and the Mythical Smart Fridge," UXMagazine.com, Sep. 18, 2013; 18 pages.

Cent, "First Look—LG Smart ThinQ LFX31995ST," YouTube.com, Sep. 9, 2013.

Duy Do, "Future Fridge," YouTube.com, Nov. 30, 2011.

* cited by examiner

RETAIL SUBSCRIPTION IN INTERNET OF THINGS ENVIRONMENT

RELATED APPLICATIONS

This invention claims priority to U.S. provisional patent application Ser. No. 62/247,878, filed Oct. 29, 2015, entitled "Retail Subscription in Internet of Things Environment," which is included entirely herein by reference.

FIELD

The present concepts relate generally to a retail subscription model, and more specifically, to the use of an Internet of Things (IoT) environment for determining where a consumer product requiring replenishment, replacement, or upgrade may be automatically delivered to the consumer, or where new or additional consumer goods may be recommended.

BACKGROUND

In modern society where convenience is important to consumers, subscription services continue to evolve. Previous generations enjoyed some subscription services, such as the daily receipt of fresh milk directly from a local farm by a milkman. Modern subscription services include the use of computers and the Internet, where a consumer can order online a subscription of goods, ranging from wine to razors to the book-of-the-month, which may be shipped from the factory to the consumer's home.

BRIEF SUMMARY

In one aspect, provided is a method for delivery to a consumer location, comprising: applying a monitoring device to a product of interest; monitoring consumption of the product of interest; automatically determining by an item replenishment device a need for replenishment, upgrade or replacement of the product of interest from the monitoring device; and performing a replenishment, upgrade or replacement of the product of interest in response to a monitoring result, and according to a set of predefined rules.

In some embodiments, the method further comprises determining, in response to the item replenishment device determining the need for replenishment, upgrade, or replacement, a prediction pattern of demand management or time sensitive advertising.

In some embodiments, the method further comprises recommending if the item is to be recalled, or available for cross-sell.

In some embodiments, the method further comprises determining by an alert generator from the processor output those alerts that are available for safety.

In some embodiments, the method further comprises collecting by a subscription device data on tags through beacons in an area to determine where consumer goods are located and how often they are used.

In some embodiments, other data includes at least one of a product expiration date and a shelf life is executed by the item replenishment device to improve a replenishment cycle along with product consumption and future upgrade releases.

In some embodiments, the method further comprises setting item tracking guidelines.

In some embodiments, the method further comprises updating a customer profile that is used to analyze the use patterns.

In some embodiments, the method further comprises associating a tag of the plurality of tags with an item of the plurality of items at a time of purchase where purchase data may be electronically communicated at the time of the e-receipt, or receiving a result of scanning the tag; and receiving by a tag tracking device a unique identification from the tagged item, which is directed to the subscription device for processing.

In another aspect, provided is a system for item replenishment, comprising a subscription device that associates tags with items; a tag tracking device for collecting data on the tags associated with the items; and an analyzer that monitors changes in use of the items, including analyzing use patterns to determine when the items should be replenished, replaced, or upgraded.

In some embodiments, the processor recommends if the item is to be recalled, or available for cross-sell.

In some embodiments, the system further comprises a cross-selling processor.

In some embodiments, the system further comprises an alert generator for determining from the processor output what alerts are available for safety.

In some embodiments, the subscription device collects data on tags through beacons in an area to determine where consumer goods are located and how often they are used.

In some embodiments, other data including at least one of a product expiration date and a shelf life is executed by a special purpose processor of the system to improve a replenishment cycle along with product consumption and future upgrade releases.

In some embodiments, the system further comprises a tracking processor for setting item tracking guidelines.

In some embodiments, the system further comprises a customer profile generator for updating a customer profile that is used to analyze the use patterns.

In some embodiments, the subscription device associates a tag of the plurality of tags with an item of the plurality of items at a time of purchase where purchase data may be electronically communicated at the time of the e-receipt, or by receiving a result of scanning the tag whereby the tag tracking device receives a unique identification from the tagged item, which is directed to the subscription device for processing.

In another aspect, provided is an Internet of things (IoT) based subscription system, including: a tag that is associated with an item, and outputs an identifier; a reader that receives the identifier and item usage information from the tag; and a processor that monitors changes in use of the items, including analyzing use patterns to determine when the items should be replenished, replaced, or upgraded.

In some embodiments, the IoT tag includes a barcode, Bluetooth, radio frequency (RF), infrared (IR), or near field communication (NFC) device.

In some embodiments, the item usage information includes a movement of the item.

In some embodiments, the management system includes a registration module that registers the tag with a subscription program that provides for the replenishment, replacement, or upgrade of the item associated with the tag.

In some embodiments, the management system includes: a tag tracking device that monitors a location, movement, or use of the tag or item; a pattern analyzer that processes data received by the tag tracking device regarding the location, movement, or use of the tag or item; an order processor that automatically orders a quantity of the item in response to a result of the pattern analyzer; and a customer profile generator that includes profile information for use by the pattern analyzer or the order processor.

In some embodiments, the management system includes a notification generator that generates from an analysis data safety alerts, marketing-related communications, or other notifications related to the item.

In accordance with another aspect, provided is a method for retail subscription, comprising: tagging one or more items for tracking; configuring a reader to receive data from the tagged items; connecting the reader to a network; registering with a subscription service; and setting one or more guidelines.

In accordance with another aspect, provided is a method for cross-selling in an Internet of Things environment, comprising identifying a first item; identifying a second item; determining if the second item enhances the first item; and notifying the customer about the second item.

BRIEF DESCRIPTION OF THE SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale, emphasis instead being placed upon illustrating the principles of the concepts.

DETAILED DESCRIPTION

Figure 1:
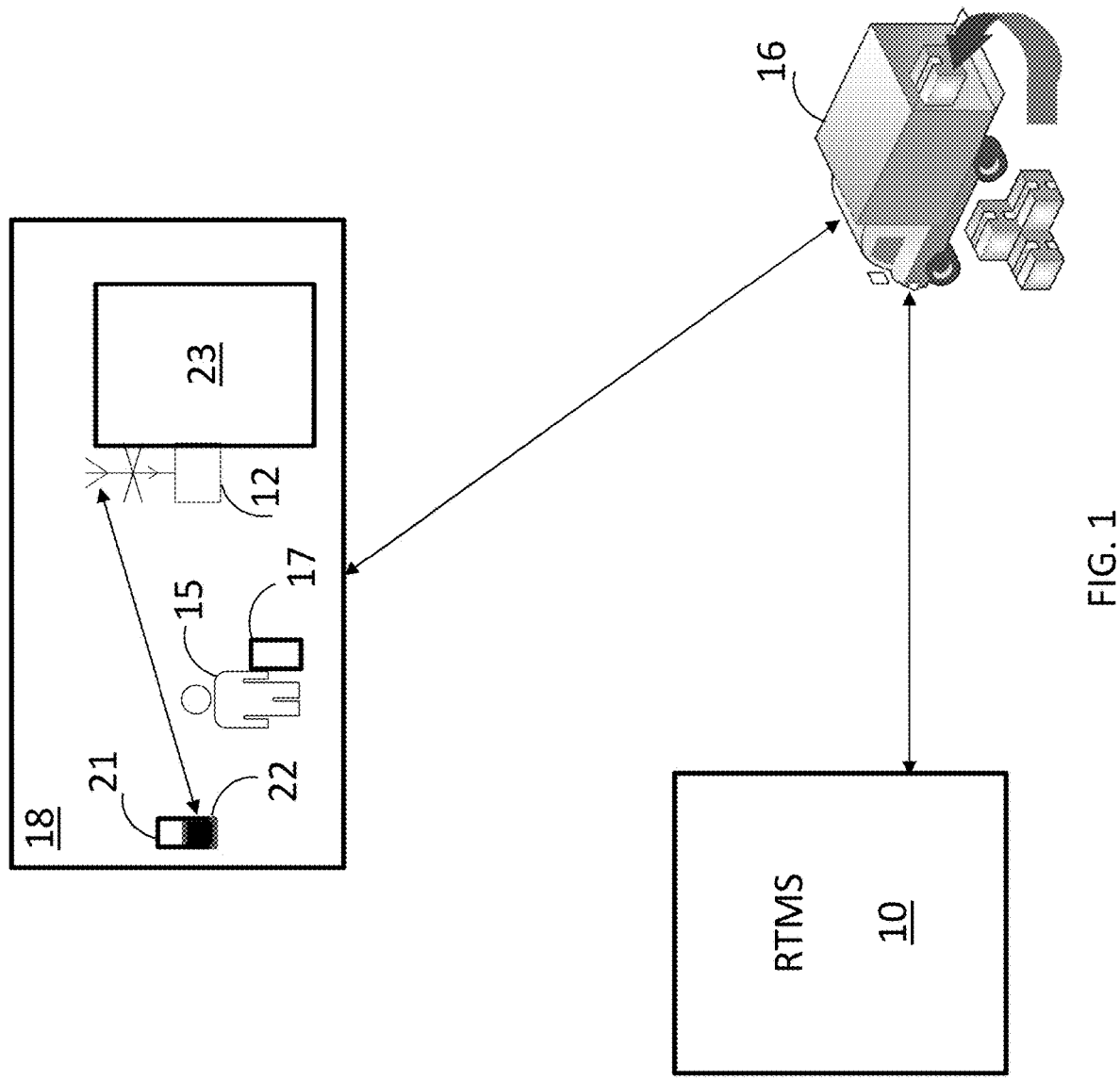
FIG. 1 is a component model of an environment in which embodiments may be practiced.

In modern society, convenience is important to a typical shopper. To address the evolving needs of the modern consumer, while also considering other revenue opportunities, many retailers may wish to offer subscription services, which may be established via the Internet, and where delivery may be made directly to the consumer's home, office, or other desired location. However, shoppers nevertheless order products and set subscription options on a retailer's website without the understanding or knowledge of whether refills, replacements, or upgrades are needed.

Systems and methods in accordance with some embodiments include the application of an Internet of Things (IoT) model, which permits consumer goods to be monitored, controlled, and/or managed remotely by special-purpose electronic devices via a network such as the Internet. The consumer has control over the automatic subscription service as to whether an item should be replenished, upgraded, or replaced. The consumer goods may be located at the subscriber's home, business, or other desired location, and may require replacement, replenishment, or upgrade, for example, perishables such as milk, meat, or vegetables, or everyday retail items such as razor blades, appliances, toilet paper, or printer cartridges. Ancillary features may include the marketing of other items based on a subscription or purchase of related items, or services such as providing alerts when a predetermined threshold is reached with respect to items under the subscription service. Related features may include providing a prediction pattern of demand management or time sensitive advertising.

To achieve the foregoing, the systems and methods in accordance with some embodiments may employ a number of active or passive tags attached to retail goods, and constructed and arranged to provide substantial real-time information about the corresponding retail goods, such as usage patterns, movement, device conditions, or activity. The tags can relay location and movement of consumer goods to distinguish estimated use through tag readers placed in the consumer's home. Accordingly, tags can be tracked by readers to enable a user to track a location or movement of specified items with specified tags. For example, a tag reader can be placed on a refrigerator for reading tags on food items, or on a washer for reading tags on clothes, or in a closet for reading tags on clothes, or at a tool box space for reading tags on the tool box and/or tools within the box.

IoT replenishment or replacement guidelines can be set through a subscription service that may obviate the need for a retail store in the chain between manufacturer and consumer. The systems and methods may perform data collection, data communication, data analysis, or tracking of items, or a combination thereof to improve the prediction of buying or automatic replenishment, replacement, upgrade, recall of the goods to which the tags are attached, so that recommendations or automatic actions may be performed. For example, the system can analyze patterns through the data collected to predict when items should be replenished automatically. The IoT environment can also determine related items for cross-selling or advertising purposes. Also, safety alerts of selected items can be established based on consumer data gathered by placing tags on products, and using electronic receivers to monitor the rate at how products are consumed, diminished, expired, or worn down, to determine whether item upgrades, replenishments, or replacements are needed.

Accordingly, embodiments of the inventive concepts may comply with a paradigm shift where a retail establishment provides consumer goods directly to a consumer's home or business, instead of a conventional model where the consumer travels to the retail establishment in order to acquire the goods, or refilling, upgrades, and so on with respect to the goods.

In some embodiments, a system uses data gathered from the home via an IoT model using beacons, e.g., RFID tags, and readers, e.g., RFID readers, as to where items are within a location and when they are used or moved to another location. For example, a user may pick up a tooth brush and place it back down, suggesting a use of the tooth brush, and from the servings of a tube of toothpaste, the system can deduce how much toothpaste is left and when it should be refilled. In another example, the system can monitor clothes entering a washing machine, and from this information the predicted durability of replacement needed on each article of clothing may be determined.

FIG. 1 is a component model of an environment in which embodiments may be practiced.

A user environment in which a customer 15 resides, operates, or otherwise moves, may include a facility at which one or more items 21 may require replenishment, replacement, upgrade, or other modification. The user environment 18 may be a home, business, or other location. In other embodiments, the user environment 18 may include an open area, such as a field, parking lot, and so on. The items 21 may each include an identifier tag 22 that collects data about the items 21. For example, the item 21 to which an identifier tag 22 may be attached may be a physical consumer good, such as a store product. The tag 22 may be provided at the time of manufacture or delivery of the item 21, or by the retailer providing the item 21 to the customer 15. In some embodiments, tags may be provided on the consumer goods 21 directly by the customer 15, for example, customers who wish to track certain items. An identifier tag 22 may include a unique identification and information about the item 21 to which it is associated. The tag 22 may include an electronic device such as a circuit for storing and processing this information. In some embodiments, an association between tag 22 and item may be made at an electronic checkout. In some embodiments, a tag 22 may be unknown, i.e., not associated with an item, but nevertheless identified by a reader 12. Here, the RTMS 10 may indicate that there is no associated item 21, whereby the user 15 may inform the RTMS 10 that the tag 22 is indeed associated with a particular item 21. The RTMS 10 may provide questions, for example, in an electronic format displayed at the user's mobile electronic device 17, which when answered results in an association between the tag 22 and the item 21.

In some embodiments, a scanning device, for example, a QR code reader on an electronic device 17, or the tag reader 12 on an appliance 23 may be used to perform an initial scan of a QR code or the like from the tag 22. The QR code may supply the information about the corresponding item, for example, the item's unique identification and other data, to the reader, which can subsequently be processed by the electronic device 17, such as a smartphone or other computer.

The tag 22 may include an antenna for transmitting a beacon or other signals to a reader 12. The tags 22 may be constructed and arranged to sense and monitor consumption, use, location, movement, and/or other change with respect to the consumer goods 21. For example, a tag 22 may be located in a water filter and collect data on an amount of water remaining in the water filter. This data can be used to determine when the water filter is at or near empty and requires refilling. In another example, a tag 22 may sense and monitor an amount of use of a computer, television set, or other electronic device. This data can be used to predict the life expectancy of the item of interest, and establish whether the device requires an upgrade or replacement based on the amount of use of the device. The tags 22 can communicate using radio frequency identification (RFID) or the like. IoT items 21 may be tagged as barcoded, Bluetooth, radio frequency (RF), RFID, infrared (IR), near field communication (NFC), or any other suitable device that can provide its identifier and attributes to one or more tag readers 12 and/or beacon devices that track tag locations when queried over a short range interface.

One or more tag readers 12 may communicate with the tags 22 for receiving tag data. For example, a tag 22 may emit a beacon or other signal that includes a unique identification of the item 21 to which the tag 22 is attached. The tag readers 12 may be part of, or complement, an electronic boundary defining the user environment 18, such as a geofenced region, WiFi network, and so on, for example, reading RFID signals or the like output from the tags 22. One or more tag readers 12 may be positioned at the user environment 18, such as a home, business, gym, automobile, or anywhere items can be tracked. A reader 12 can read the tags 22 through use of radio waves or other frequency signal. In some embodiments, a beacon signal output by a tag reader 12 may energize a tag 22 in communication with the tag reader 12. As the tag 22 gets closer to a reader 12, the tag 22 may emit a stronger signal, enabling the location to be triangulated where items 21 are located and how they are moved. Scanners, beacons, readers, or the like may operate to permit the items 21 to be tracked in real time, for example, priority track items.

The tags 22 can be used to determine usage and movement information about the goods 21 to which the tags 22 are attached. The tag reader 12 can forward data received from the tags 22, e.g., tag identifier information, usage or movement data, and so on, to a retail subscription management system (RTMS) 10 an electronic network, for example, the Internet. This data can be used to predict when items should be replenished, replaced, or upgraded automatically.

A combination of the tags 22, tag readers 12, and RTMS 10 may form at least part of an IoT environment. As described, the tags 22 identify the items 21 and outputs to item identifiers via a reader 12 to the RTMS 10. A reader 12 may also detect movement of the tracked item 21 by communicating with the corresponding tag 22, and communicate the movement data to the RTMS 10 via the Internet.

The RTMS 10 may receive IoT data, for example, via the tag reader 12. IoT data may include the unique identification of the tagged item 21, which is received by the reader 12. For example, clothes may be tagged and placed in the closet might indicate that the clothes are new and recently purchased and stored at the consumer's home, for example, in a closet or bureau. The system can distinguish the location of the clothes, for example, hung in a closet, or placed in a washing machine. In the latter case, the IoT data can establish that the clothes have been used. As clothes are predicted to expire, the system may predict the number of uses based upon prior data collected on these types of clothes from the manufacturer. When a certain threshold was set by the manufacture as to the durability of the articles, a new set of clothes may be automatically ordered.

The RTMS 10 may store a set of records that include a tag identifier and an item identifier so that the system 10 knows what tags 22 are on what items 21. Thus, the RTMS 10 associates the tag 22 with the consumer goods 21. The association can be formed, or established, at a time of purchase where the purchase data may be electronically communicated at the time of the e-receipt. In another example, the association could be set by the customer 15 by scanning the QR code and a tag receiver picking up the unique id off the tagged item 21. The RTMS 10 may analyze usage or movement patterns from this received data to determine that the goods 21 are consumed, diminished, expired, worn down, or otherwise modified, and/or requires an upgrade, replenishment, or replacement. The system 10 can ensure that the upgrade, replenishment, or replacement occurs automatically by communicating with a source 16 that may provide the requested upgrade, replenishment, or replacement to the user environment 18.

In some embodiments, other items may be available which enhance or complement the usage of the item 21. Examples of other items may include an attachment, different flavor, or an associated product which are known for being purchased by other customer, for example, determined using analytics, marketing data, or POS data. The RTMS 10 may communicate with websites, databases, and/or other electronic devices that provide this data, and search for associated items, and determine from this data whether other products may be of interest to the user 15. The RTMS 10 may use this collected data to "cross-sell" other items by providing recommendations to the user 15, for example, marketing, advertisement, promotion, etc. to the user 15, and recommend what items are available for cross-selling. For example, a purchased item may be milk with a tag number 1234. Once that number is associated with milk and is picked up by the reader 12 on a smart refrigerator, the system may check to see what are items affiliated with milk, such as cookies or chocolate syrup. The time sensitivity is around milk consumption and displaying the right advertisement associated with the product that needs refill, replenishment, or upgraded. Accordingly, the RTMS 10 may proactively recommend certain actions, events, products, services, or other items that may be relevant or helpful to the customer 15 according to various criteria and objectives and based on real-time knowledge about the items 21.

In other embodiments, the RTMS can generate item safety warnings, which may be received by the user 15, more specifically, a computer electronic device such as a smartphone or laptop computer. For example, the tags 22 may monitory the rate at how the corresponding items 21 attached to the tags 22 are diminished, expired, or worn down, which may result in safety-related issues. For example, a tag 22 attached to a smoke detector may determine that the smoke detector battery requires replacement, and send this information to the RTMS 10, which may generate an alert regarding the need to replace the smoke detector battery, or for other reasons such as monitored rate of use results.

Figure 2:
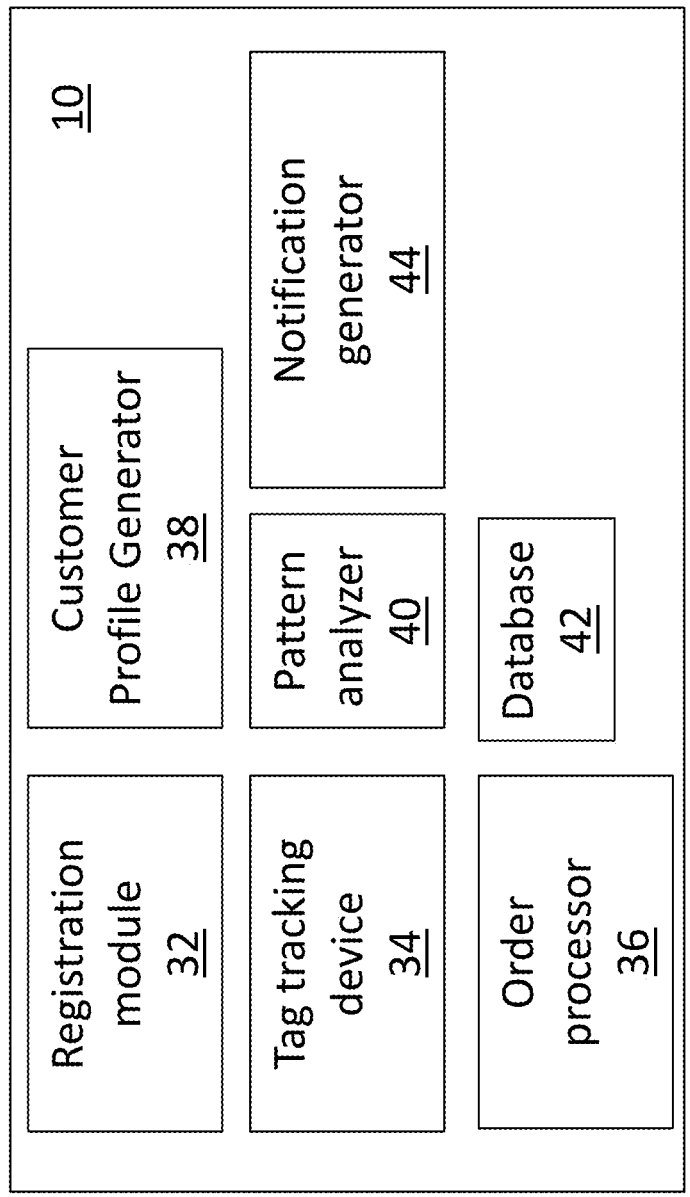
FIG. 2 is a block diagram of a retail subscription management system (RTMS), in accordance with some embodiments.

FIG. 2 is a block diagram of an RTMS 10, in accordance with some embodiments. The RTMS 10 can be implemented in the environment illustrated and described with respect to FIG. 1.

The RTMS 10 may include a registration module 32, a tag tracking device 34, an order processor 36, a customer profile generator 38, a pattern analyzer 40, a database 42, and a notification generator 44. Some or all of these elements of the RTMS 10 may be present under a same computer hardware platform. In other embodiments, these elements may be located on two or more different computer hardware platform, and can communicate with each other and/or other elements of the RTMS 10 via a communication network, for example, wired or wireless network that exchanges data electronically.

The registration module 32 registers a plurality of tags 22 with a subscription program so that the tags 22 are each associated with an item 21 at a user environment 18. The user environment 18 any include tagged IoT devices, for example, described herein, to acquire the necessary upgrade, refill, or replenishment items in accordance with the subscription program. To achieve this, the database 42 may store a set of records that include data received by the RTMS 10 from the tags 22 via the beacon readers 12 in the user environment 18, each record including a tag identifier, an item identifier that associates the item 21 with the tag 22, and item data or metadata, for example, historical data about movements and/or use of the item 21. The records are constructed and arranged so that the system 10 can determine associations between tags and items, and process item-related data for a subscription service.

As described herein, tags have a unique identification which is associated with a specific item 21. Some items 21 may be associated with other products in a database of products. The expiration information and upgrades are also maintained which establishes a determination for an item 21 when it needs to be upgraded and with what other items 21 may correspond with this item 21. Also, a determination may be made regarding an amount of servings that are within an item 21 so that the system can determine when to refill or replenish the item 21. If the item 21 is constructed to receive refills, then refills are provided. If the whole item 21 needs to be replenished then the item replenishment is provided. If the item 21 has components which need replacement due to wearout or other reason, then a new part may be provided. For example, the item 21 may be a shampoo dispenser which is determined via the tag 22 to need a refill. In another example, a vacuum may be determined to require a replacement of its bag.

Accordingly, the tag tracking device 34 monitors item location, movement, use, and so on by communicating with the tags 22 associated with the items 21 at the user environment 18 and/or readers 12. The tag tracking device 34 may store collected data regarding the items 21 at the database 42 or other data storage device.

The pattern analyzer 40 may process data received by the tag tracking device 34, and for analyzing usage or movement patterns of the items 21. Analysis data may be used to predict when items 21 should be replenished, upgraded, or replaced. Analysis data may be used to recommend if an item 21 is to be recalled, what items are available for cross-sell, and/or what alerts are needed for safety. When a recall occurs, the manufacturer sends the data electronically to the consumer computer and/or RTMS 10, or other predetermined destination. The RTMS 10 may then search for information on the product, for example, the sales representative of the product. The RTMS 10 may can automatically request a replacement for the recalled item, for example, by checking a point of sale (POS) database as to who sold the product. Here, the customer 15 may register for the program which makes tracking the items purchased and who they are, and where they are easier.

The notification generator 44 may generate from analysis data safety alerts, marketing-related communications such as product advertisements, or other notifications related to the items 21 in the user environment 18.

Figure 3:
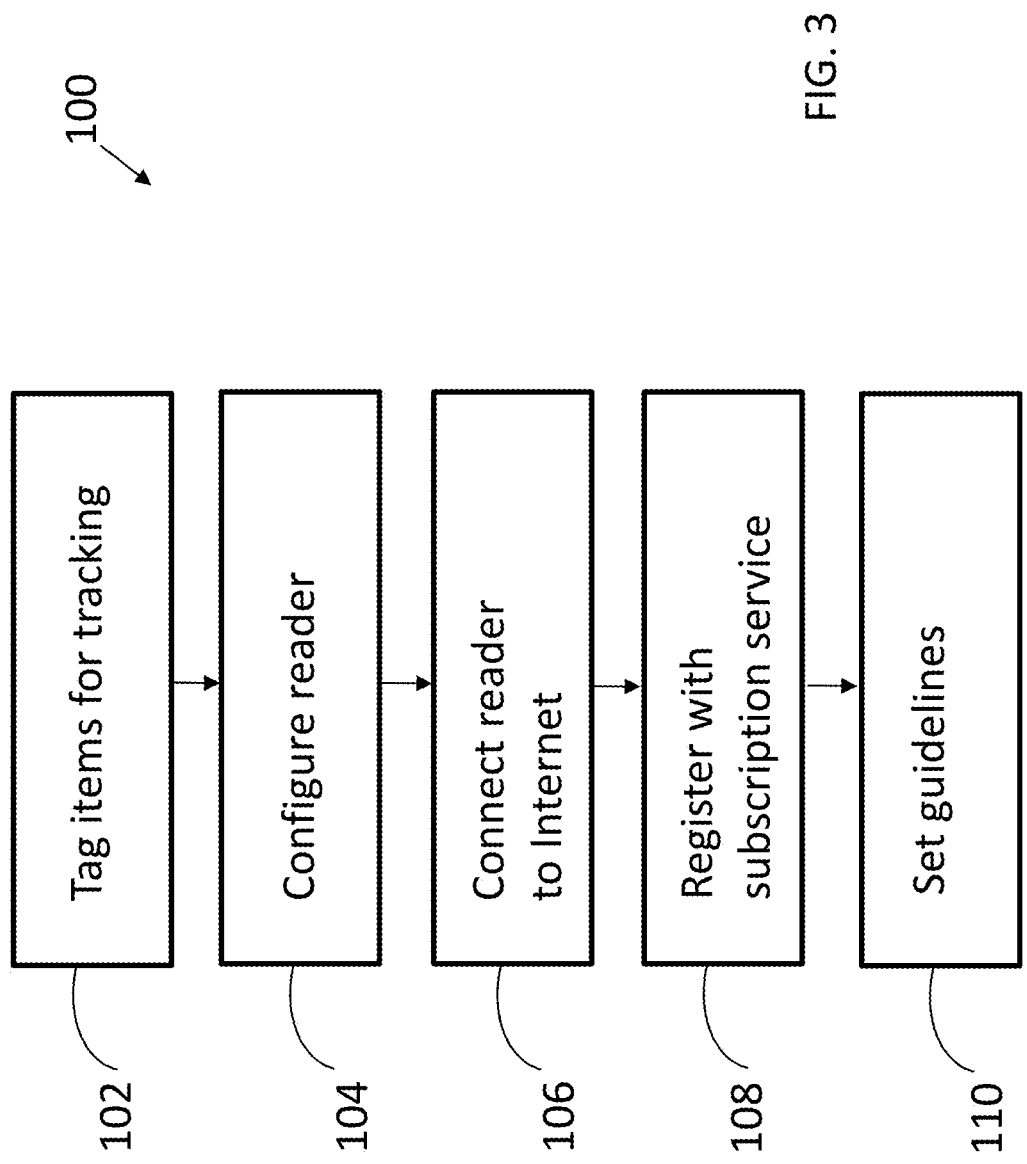
FIG. 3 is a flowchart of a method for configuring an IoT environment for a subscription service, in accordance with some embodiments.

FIG. 3 is a flowchart of a method 100 for configuring an IoT environment for a subscription service, in accordance with some embodiments. Some or all of the method 100 can be performed at the RTMS 10 of FIGS. 1 and 2, and/or other elements of the environment illustrated in FIG. 1. The method 100 can be governed by instructions that are stored in a memory device of the RTMS 10 of FIGS. 1 and 2, and/or other elements of the environment illustrated in FIG. 1, and executed by a hardware processor of the RTMS 10 of FIGS. 1 and 2, and/or other elements of the environment illustrated in FIG. 1.

At block 102, items, for example, goods 21 are coupled to tags 22, and can be sold to or otherwise acquired by a consumer. The tags 22 may be associated with the items 21 at the time of manufacturing, for example, by a representative of the retail establishment offering the items 21 for sale, or by the customer 15. The tags 22 are constructed and arranged to exchange electronic communication signals with a beacon reader 12, and for including unique identification data that distinguishes the tags 22 from each other. As described herein, each tag 22 can include data, metadata, or the like regarding the items 21 to which the tags 22 are associated, respectively, and can transmit a unique identification when radiated. In particular, the tag 22 has the unique identifier, and an association can be formed, or established, at a time of purchase where the purchase data may be electronically communicated at the time of the e-receipt. In another example, the association could be set by the customer 15 by scanning the QR code and a tag receiver picking up the unique identifier off the tagged item 21.

At block 104, the tag reader 12 is configured to communicate with the tags 22. The beacon reader 12 can include one or more different beacons, and can be positioned anywhere proximal to the items 21, for example, home, office, automobile, or anywhere the items 21 may be tracked. The reader 12 is configured to be associated with what is being tracked. For example, a reader on the washing machine would track the input of clothes. The input of clothes into the washer would indicate the usage of soap and the wear. Thus, the tag reader 12 can receive tracking data from the tags 22 to determine use-related information and/or movements with respect to the items 21 corresponding to the tags 22.

At block 106, the beacon reader 12 can connect with a communications network, for example, the Internet. In doing so, the beacon reader 12 can communicate data received from the tags 22 to the RTMS 10 and/or other system that can process the received data.

At block 108, the tags 22 are registered with a subscription service, for example, for automatic replacement, replenishment, or upgrade services with respect to the consumer goods 21. For each item 21, the RTMS 10 sets a recommendation as to whether the item 21 should be refilled, replenished, replaced, or upgraded. The user may override this setting. The override may be the case where they always want a replacement instead of a refill or upgrade. The subscription service may include tagged IoT devices, for example, described herein, to acquire the necessary upgrade, refill, or replenishment items in accordance with the subscription service. In registering with a subscription service, the tags 22 can be associated with the corresponding items 21.

The association between tag 22 and item 21 may occur at the time of purchase when the retailer assigns the tag 22 to the item 21. In creating this association, for example, at a point of sale system or other retail electronic device, the product information to which the tag 22 is associated may information such as expiration date, purchase date, warranty period, and so on. In other embodiments, the consumer 15 may associate the tag 22 with the item 21, for example, set by the user when the tag is first read. The tag reader 12 may communicate the tag 21 to the system 10, which in response may communicate back to the user's interface for authentication or confirmation of the information.

At block 110, one or more guidelines are set. In some embodiments, the guidelines include TOT replenishment guidelines for the items 22 through the subscription service. Guidelines may be initially set by the manufacturer such as serving sizes, consumption rates, every so many miles of usage, number of switch flips, and so on. From this, the usage may be tracked and a predictive threshold may be computed as to when something should be replaced, refilled, repaired, or upgraded. The replenishment guidelines may be based upon consumer request, for example, an electronic submission of a request. In some embodiments, automatic replenishment is set for items that the customer 15 uses regularly. In some embodiments, the tag 22 can register a remaining product left based on movement. For example, a tag 22 may transmit a number which is read by one or more readers 121. The RTMS 10 registers the movement of tags 22 when the tags 22 are picked up by different readers 12. The movement of tags 22 may be assumed as usage of the items to which the tags 22 are attached. For example, when clothes are thrown into the washer their tags are read by the tag reader on the washer indicating usage of clothes, which computes to be a serving of laundry detergent, fabric softener, and so on. It also indicates the wearing of the clothes which will wear out and need to be replaced, Movement of a tagged item 21 can be tracked by a triangulation between beacon readers 12 and the tag 22.

A tag 22 may move with the corresponding item 21 many times. In some embodiments, a predetermined threshold number of movements may be established, and configured and stored at the tag tracking device 34 or pattern analyzer 40. Here, the order processor 36 can automatically order a quantity of the item 21, for example, for replenishment, when the pattern analyzer 40 establishes that the actual number of movements of the item is at or exceeds the threshold value. Similarly, the pattern analyzer 40 can calculate use of the item 21 in a predicted consumption or pre-failure determination analysis, for example, when estimating an end-of-life of the item 21 due to wear and tear, life expectancy, and so on. The notification generator 44 can generate an order preview which can be sent to the user 15. This may ensure that the item 22 is not automatically ordered for moving about but not used.

Another guideline may relate to item tracking guidelines. Tagged items 21 can be tracked by a tag signal via the beacon reader 12 so that the tag 22 is in communication with the beacon reader 12. Once the tag 22 is proximal the beacon reader 12, for example, sufficiently close to the beacon reader 12 so that a communication exchange can occur, the beacon reader 12 can register where and when the tag 22 is at the point where the beacon reader 12 establishes a communication with the tag 22. Here, tag data can be output via the Internet or other network in communication with the beacon reader 12 to the RTMS 10, where the data can be stored at the database 42. Once the RTMS 10 receives this data, the RTMS 10 can notify the customer 15 if the tag 22 moves outside a predetermined threshold, for example, a predetermined number of feet from the beacon reader 12. The customer 15 may log into an application for example, at the user's smartphone or personal computer, that tracks individual items, activity related to the items 21, and so on. A specific location of the tag 22 can be determined, for example, by using one or more readers 12 to triangulate the tag's location, to see how often the item 21 moves within the threshold region. In some embodiments, the customer 15 may determine from the RTMS 10, i.e., by viewing data on a user interface, a last known location of the item 21, for example, by establishing a beacon reader 12 that the tagged item passed.

Another guideline may relate to upgrade guidelines. Tagged items 21 may be establish upgrade guidelines. The customer 15 may select an automatic upgrade feature, for example, at the RTMS 10. The automatic upgrade feature may bypass notifying the customer 15 of availability, and send the upgraded item to the customer 15 directly. In some embodiments, the customer 15 may select to receive a notification of item upgrades, for example, generated by the RTMS 10 and output to a smartphone or other electronic device. Here, when an upgrade is available, the RTMS 10 can generate a notification to the customer 15. The customer 15 can configure the RTMS 10 to ignore upgrades, for example, via the user interface directly communicating with the RTMS 10, or otherwise opt out of receiving notifications regarding advertisements, discounts, or other marketing information otherwise provided to the customer 15. The customer 15 may have flexibility in selecting if and when they wish to receive an upgrade for an item 21.

Another guideline may relate to recall guidelines, which may be configured by the customer 15. Recall guidelines may include a setting where the item 21 is an electric product, which may be shut down in response to a determination that a recall is necessary. Recalls of products may be set by the manufacturer when defects are identified. The manufacturer notifies the retailer. The retailer may search a point of sale (POS) database or the like to identify the buyer and notify the buyer. Here, the RTMS 10 may automatically for the automatic replacement of a product identified for recall by receiving and processing such data. This may establish a connection with the IoT A recall association may be established to notify the customer 15 that the customer should not be using a particular product because it has been recalled. The RTMS 10 can warn and alert a customer 15 that the customer 15 is using a recalled product, and/or recommend a replacement product. They should be using the replacement product instead. In response to the RTMS 10 processing an alert, it can automatically order a replacement item. In some embodiments, the RMTS 10 can alert the customer 15 of an issue and allow the customer to decide whether to replenish or ignore. The customer 15 may select, for example, at a user interface in communication with the RTMS 10, to ignore all alerts. The customer 15 may opt out of receiving recall notifications from the RTMS 10. For example, the customer 15 may accept the risk of using a recalled product which is highly unadvisable. Here, the customer 15 may access a mobile or web application from an electronic device such as a smartphone 17, and accept the liability by ignoring these warnings.

Figure 4:
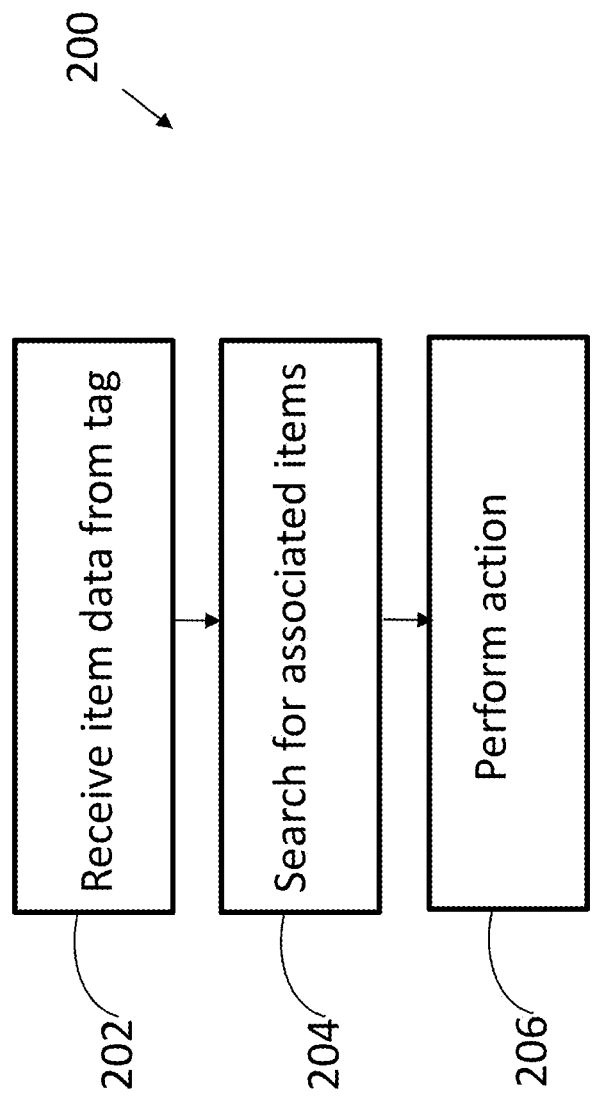
FIG. 4 is a flowchart of a method for providing a retail subscription service in an IoT environment, in accordance with some embodiments.

FIG. 4 is a flowchart of a method for providing a retail subscription service in an IoT environment, in accordance with some embodiments. Some or all of the method 200 can be performed at the RTMS 10 of FIGS. 1 and 2, and/or other elements of the environment illustrated in FIG. 1. The method 200 can be governed by instructions that are stored in a memory device of the RTMS 10 of FIGS. 1 and 2, and/or other elements of the environment illustrated in FIG. 1, and executed by a hardware processor of the RTMS 10 of FIGS. 1 and 2, and/or other elements of the environment illustrated in FIG. 1.

At block 202, item data is received from a tag 22 associated with a consumer item 21. Item data may include usage data such as a remaining amount and/or consumed amount of the item. For example, the item 21 may include food, and the data can include an amount of the food that is remaining. In another example, the item 21 may be a battery, and the data can include an amount of battery life. Other data may collected by the tag 22 may be received by the RTMS 10, such as movement data, or a location of the item 21, or activity related to the item 21. Other item data may include movement data, where a movement of the tag 22 is captured via beacon readers 12 by the RMTS 10 and can establish usage of the item 21.

At block 204, a search may be performed for other items associated with the item 21. The RMTS 10 may collect data about other items related to the tagged item 21. Data may be collected from any number of sources, including but not limited to databases, public and private data repositories, websites, mobile device applications, and so on. This other data may be determined from the customer profile generator 38, which processes information about the customer 15 from the database 42, and may update a customer profile that is used to analyze item use patterns. For example, another item may be an item that complements or functions with a tagged IoT device. In another example, the customer profile generator 38 may establish that the customer 15 purchases a particular flavor of toothpaste. The order processor 36 may order this flavor of toothpaste when a current toothpaste supply, which is tagged, is determined to be depleted, or otherwise determined to require replenishment.

At block 206, an action may be performed based on a determination of usage or movement of the item 21. For example, a related item determined from block 204 may be automatically ordered. Another action may include the RTMS 10 communicating with a smartphone or other electronic device of the customer 15 that an item replenishment, replacement, or upgraded is recommended or required. Here, the user may have an option to reject such a recommendation, for example, by submitting a response electronically from the smartphone or other electronic device to the RTMS 10.

Figure 5:
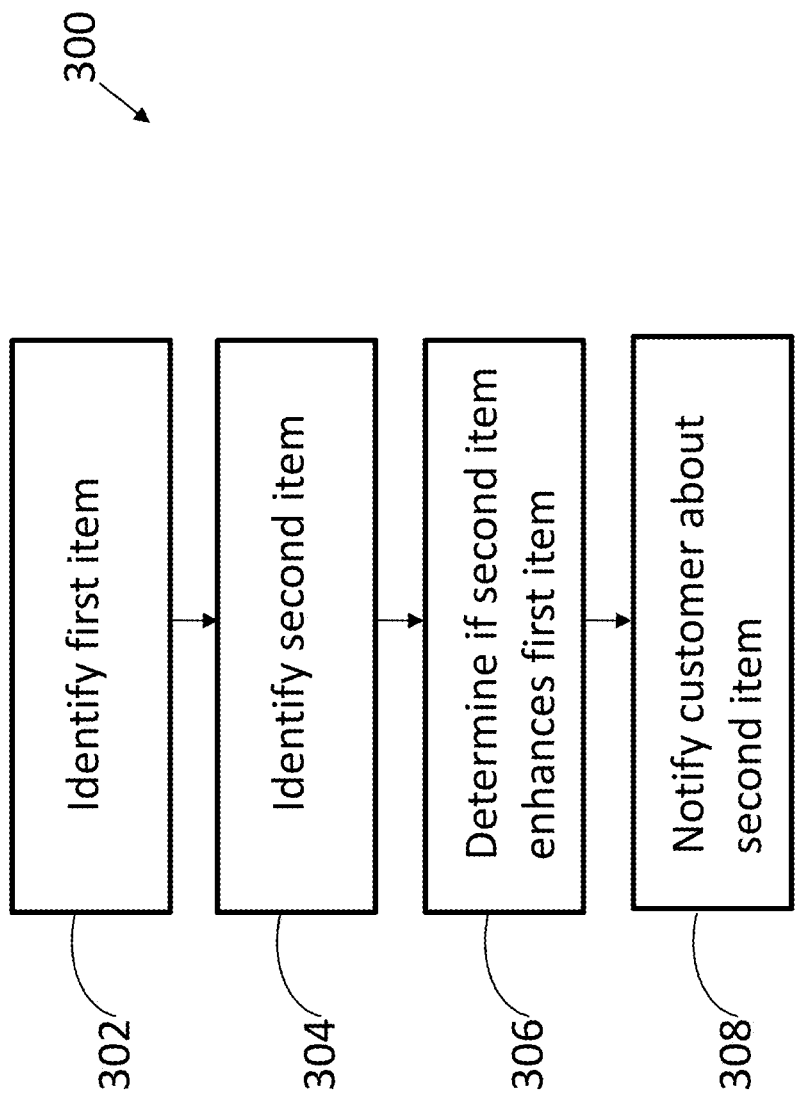
FIG. 5 is a flowchart of a method for cross-selling in an IoT environment, in accordance with some embodiments.

FIG. 5 is a flowchart of a method 300 for cross-selling in an IoT environment, in accordance with some embodiments. Some or all of the method 300 can be performed at the RTMS 10 of FIGS. 1 and 2, and/or other elements of the environment illustrated in FIG. 1. The method 300 can be governed by instructions that are stored in a memory device of the RTMS 10 of FIGS. 1 and 2, and/or other elements of the environment illustrated in FIG. 1, and executed by a hardware processor of the RTMS 10 of FIGS. 1 and 2, and/or other elements of the environment illustrated in FIG. 1.

At block 302, a first item is identified. The first item includes a tag, for example, described herein. An association is established between the first item and the tag so that the tag may gather data about the item, such as usage, movement, and so on.

At block 304, a second item is identified. For example, the tag tracking device 34 may collect data on second items that are tagged. In other embodiments, the second item may not include a tag. The customer profile generator 38 may include profile information that establishes whether the second item is related to the first item. In other embodiments, the pattern analyzer 40 may establish from other information sources whether the second item is related to the first item, for example, by analyzing purchase history and so on.

At block 306, the RTMS 10 may determine if the second item enhances or otherwise complements the first item. For example, the first item may be a bottle of milk and the second item may be chocolate syrup, which may be added to the milk. A determination may be made that the supply of milk at the customer's home is almost empty. Here, the RTMS 10 may also establish that the customer 15 enjoys chocolate milk and has made prior purchases of chocolate syrup. Accordingly, at block 308, the customer 15 may be notified of the opportunity to purchase chocolate syrup with the next replenishment of milk, or receive a coupon, advertisement, promotion related to chocolate syrup.

In some embodiments, the customer may automatically purchase the second item, for example, as part of an IoT subscription service. In other embodiments, the customer may have an option whether to accept the second item. In other embodiments, the customer may select to not receive information on the second item, for example, by entering a request into a user interface in communication with the RTMS 10.

In some embodiments, the RTMS 10 may provide a time sensitive advertising technique. Here, the RTMS 10 learns more about the customer 15 as the customer 15 uses offered services and purchases products. Additionally, third party systems may provide demographic data on customers which assists the retail provider to learn more about its customers. For example, the customer 15 may set user preferences when subscribing to a service that includes the replenishment of items 21, which may be captured by the RTMS 10. As the customer 15 uses the items 21, the RTMS 10 can gather purchase data, use data, such as frequency of use, and so on.

In some embodiments, a safety warning related to a retail subscription service may be generated in an IoT environment, in accordance with some embodiments. Customers can configure the RTMS 10, for example, via an application on a smartphone or other computer, to receive safety warnings, or opt out of receiving safety warnings. Safety warnings may relate to power failures, inclement weather alerts, health hazards, and so on. For example, the customer 15 may receive an alert that a product being purchased has nuts and may subject a user to the dangers of nut allergies.

In some embodiments, the customer 15 may have a warranty on an item. Warranty-related notifications can be provided to the customer 15, or the customer may elect not to receive such notifications, for example, by selecting an option on an application executed on a computer and communicating with the RTMS 10. Warranty purchases may be automatically provided, or the customer 15 may waive the option of possessing a warranty.

As will be appreciated by one skilled in the art, concepts may be embodied as a device, system, method, or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Computer program code for carrying out operations for the concepts may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Concepts are described herein with reference to flowchart illustrations and/or block diagrams of methods, apparatus (systems) and computer program consumer goods according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program consumer goods according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While concepts have been shown and described with reference to specific preferred embodiments, it should be understood by those skilled in the art that various changes in form and detail may be made therein without departing from the spirit and scope as defined by the following claims.

What is claimed is:

1. A method for delivery to a consumer location, comprising:
    registering with a subscription service that determines an automatic purchase of both a product of interest and an item having a relationship with the product of interest;
    applying a monitoring device to the product of interest;
    monitoring consumption of the product of interest;
    automatically determining by an item replenishment device a need for a replenishment, upgrade or replacement of the product of interest from the monitoring device in response to a result generated by the monitoring device in response to sensing and monitoring the product of interest, and according to a set of predefined rules;
    identifying the item having a relationship with the product of interest and combining both the item and the product of interest for a same delivery;
    generating the automatic purchase of both the item and commensurate with the performed replenishment, upgrade or replacement of the product of interest.

2. The method of claim 1, further comprising determining, in response to the item replenishment device determining the need for replenishment, upgrade, or replacement, a prediction pattern of demand management or time sensitive advertising.

3. The method of claim 1, further comprising recommending if the product of interest is to be recalled, or available for cross-sell.

4. The method of claim 1, further comprising generating by a notification generator safety alerts regarding the product of interest.

5. The method of claim 1, further comprising collecting by a subscription device data on tags through beacons in an area to determine where consumer goods are located and how often they are used.

6. The method of claim 1, wherein automatically determining by an item replenishment device a need for a replenishment, upgrade or replacement of the product of interest from the monitoring device includes processing other data including at least one of a product expiration date and a shelf life is executed by the item replenishment device to modify a replenishment cycle of the product of interest along with product consumption and future upgrade releases of the product of interest.

7. The method of claim 1, further comprising setting item tracking guidelines.

8. The method of claim 1, further comprising updating a customer profile that is used to analyze use patterns of the product of interest for identifying the item.

9. The method of claim 5, further comprising:
associating a tag with the product of interest at a time of purchase where purchase data is electronically communicated at the time of an e-receipt, or receiving a result of scanning the tag; and
receiving by a tag tracking device a unique identification from the tagged item, which is directed to the subscription device for processing.

10. A system for item replenishment, comprising:
a subscription device that associates tags with items of products of interest;
a tag tracking device for collecting data on the tags associated with the items;
an analyzer that monitors changes in use of the items, including analyzing use patterns to determine when the items should be replenished, replaced, or upgraded and outputs a monitoring result;
a customer profile generator that identifies a relationship between a first item of the items and a second item having no tag, wherein the analyzer processes the data collected by the tag tracking device and generates analysis data for recommending the second item; and
an order processor that automatically orders the second item in response to the monitoring result of the analyzer, wherein the system registers with a subscription service that determines the automatic order of both the first and second items.

11. The system of claim 10, wherein the processor analyzer recommends if the item is to be recalled, or available for cross-sell.

12. The system of claim 10, further comprising a cross-selling processor.

13. The system of claim 10, further comprising a notification generator safety alerts regarding the product of interest.

14. The system of claim 10, wherein the subscription device collects data on tags through beacons in an area to determine where consumer goods are located and how often they are used.

15. The system of claim 10, wherein the analyzer processes other data including at least one of a product expiration date and a shelf life is executed by a special purpose processor of the system to modify a replenishment cycle of the product of interest along with product consumption and future upgrade releases of the product of interest.

16. The system of claim 10, further comprising a tracking processor for setting item tracking guidelines.

17. The system of claim 10, further comprising the customer profile generator for updating a customer profile that is used to analyze the use patterns for identifying the second item having a relationship with the first item.

18. The system of claim 10, wherein the subscription device associates a tag with the product of interest at a time of purchase where purchase data is electronically communicated at the time of an e-receipt, or by receiving a result of scanning the tag whereby the tag tracking device receives a unique identification from the tagged item, which is directed to the subscription device for processing.

\* \* \* \* \*